United States Patent [19]

Stultz et al.

[11] 3,952,185

[45] Apr. 20, 1976

[54] STANDARD DEVIATION DETERMINING APPARATUS

[75] Inventors: Edward B. Stultz, Chesterfield, Va.; Thomas A. Budne, Great Neck, N.Y.

[73] Assignee: Philip Morris Incorporated, New York, N.Y.

[22] Filed: Jan. 17, 1975

[21] Appl. No.: 541,842

[52] U.S. Cl. .......................... 235/151.13; 235/183; 235/193; 131/22 R
[51] Int. Cl.² .......................................... G06G 7/48
[58] Field of Search ............... 235/151.13, 183, 193, 235/151.3, 184; 131/21 R, 21 A, 21 B, 22 R

[56] References Cited
UNITED STATES PATENTS

| | | |
|---|---|---|
| 2,965,300 | 12/1960 | Radley et al. ............... 235/151.13 X |
| 3,146,344 | 8/1964 | Palmer ........................... 235/193 X |
| 3,560,801 | 2/1971 | McArthur ..................... 131/21 B X |
| 3,763,361 | 10/1973 | Smart ............................. 235/183 X |
| 3,808,411 | 4/1974 | Hoffmann ....................... 235/193 X |

*Primary Examiner*—Joseph F. Ruggiero
*Attorney, Agent, or Firm*—Watson Leavenworth Kelton & Taggart

[57] ABSTRACT

Standard deviation determining apparatus includes an integrator for integrating changes exhibited by a random variable, a circuit for selecting integrator output signals and a further circuit for averaging signals selected by the selecting circuit. The apparatus provides for periodic resetting of the integrator, for selecting integrator output signals occurring during predetermined time periods and for maintaining the integrator output constant in amplitude during the selecting of signals therefrom.

12 Claims, 4 Drawing Figures

STANDARD DEVIATION DETERMINING APPARATUS

FIELD OF THE INVENTION

This invention relates to systems and apparatus for use in manufacturing process control and more particularly to systems and apparatus for generating signals indicative of the standard deviation of a randomly distributed variable distribution.

BACKGROUND OF THE INVENTION

In the continuous manufacture of individual articles, a given article characteristic is often sufficiently indicative of the nature of such articles to permit article quality control to be based primarily upon determinations of variations in such article characteristic. By way of example, in the cigarette-making industry, weight measurements are made of individual cigarettes in the course of their manufacture and a signal is provided indicative of standard deviation. A meter or like display device responsive to such standard deviation signal thus provides an index of manufacturing process performance and permits a variety of courses of action to improve the process.

SUMMARY OF THE INVENTION

The present invention has as its primary object the provision of improved systems and apparatus for providing output signals indicative of the standard deviation of a random variable constituting a characteristic of manufactured articles.

In attaining this and other objects, the invention implements a novel approach to standard deviation determination wherein measurements are made of a characteristic of manufactured articles and selective of such measurements are processed, i.e., amplitudes which deviate from a preselected characteristic "target" value.

Systems and apparatus according with the invention comprise an integrator and associated control circuitry for operating the integrator on the examination of sampled articles, a selector circuit for determining when the integrator circuit output signals are to be processed and circuit means for storing and averaging the selected integrator output signals to provide a further output signal indicative of standard deviation.

The foregoing and other objects and features of the invention will be evident from the following detailed description of a preferred embodiment thereof as illustrated in the drawings.

DESCRIPTION OF PREFERRED EMBODIMENTS

Figures 1, 2:
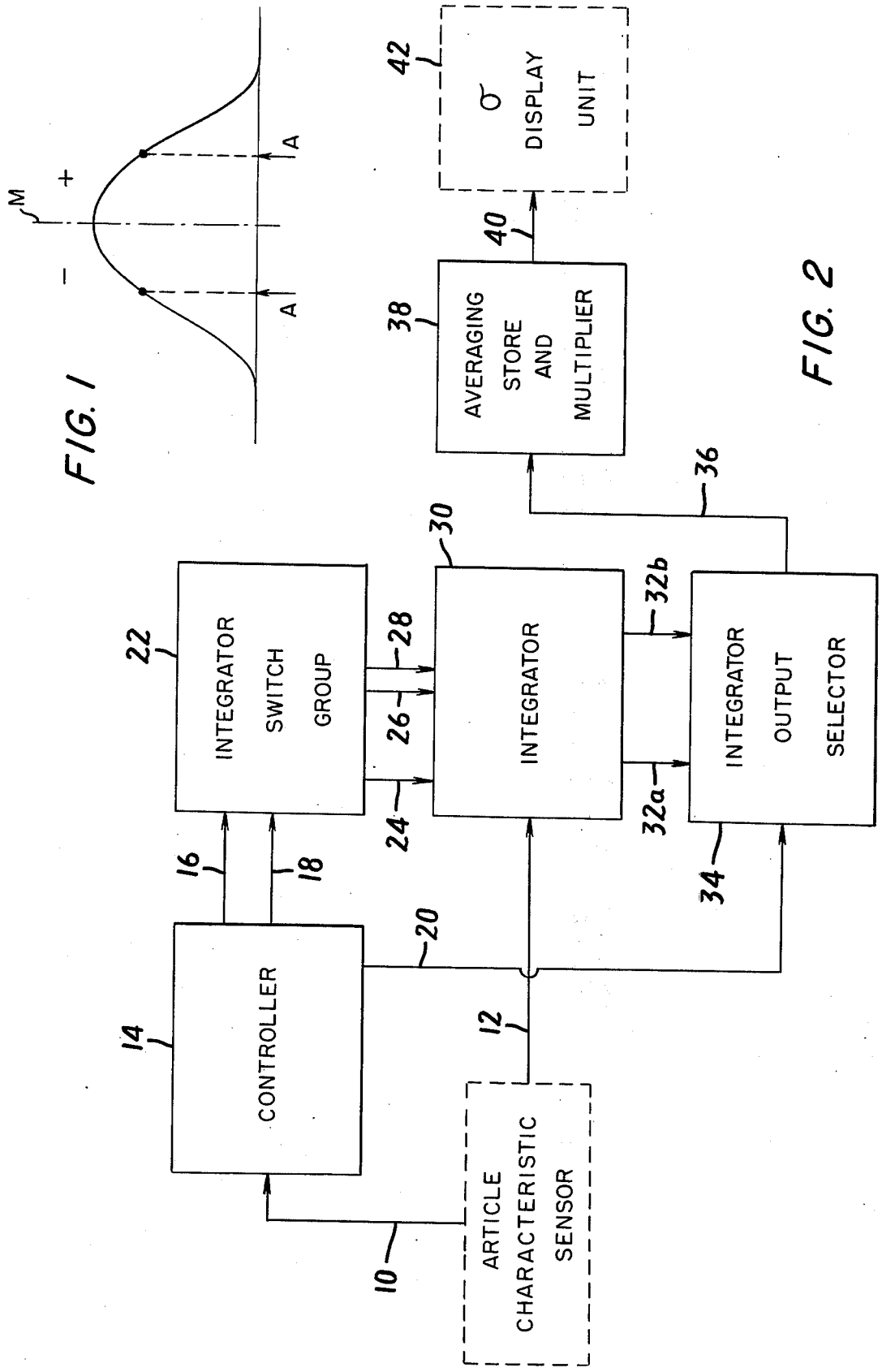
FIG. 1 shows a distribution curve with notations helpful to an understanding of the invention.
FIG. 2 is a functional block diagram of apparatus according with the invention.

Referring to FIG. 1, a statistical dispersion of cigarette weights includes an arithmetic mean M about which are equally distributed weight groupings respectively greater than (+) and less than (−) the mean. The average of the absolute value of the weights is indicated in FIG. 1 as A. By statistical formulation, the standard deviation ($\sigma$) can be expressed as a multiple of $\sqrt{\pi/2}$ of average A. As presently discussed, the apparatus of the invention provides first for a determination of average A based on selective examination of the (+) weight groupings of FIG. 1 and then scales such average by the scale factor $\sqrt{\pi/2}$.

Referring to FIG. 2, an article characteristic sensor is illustrated in broken lines and provides output signals on lines 10 and 12, respectively indicative of the completion of examination of an individual article (article clocking signal) and the article characteristic observed during such examination (article weight signal). Such sensors are in present commercial use in combination with standard deviation computers diverse from that of the present invention, and are also disclosed in patents. For example, commonly-assigned U.S. Pat. No. 3,043,507 discloses this type of apparatus as a sub-combination of its cigarette weight examining system.

Controller 14 is operatively responsive to the article clocking signal on line 10 to generate output signals on lines 16, 18 and 20. The signals on lines 16 and 18 are applied to integrator switch group 22, output lines 24, 26 and 28 of which are connected to integrator 30. Responsive to conditions on lines 24, 26 and 28, integrator 30 performs selective integration of the article weight signals on line 12. While the interrelationship of these elements of FIG. 2 will be explained in detail in conjunction with the detailed discussion of the schematic diagram of FIG. 3, it may be stated generally that controller 14 and switches 22 effect a timing operation whereby integrator 30 is reset to a zero output condition prior to article examination, i.e., during a first time interval, and is then permitted to perform an integration of article characteristic signals (integrating interval). At the end of such integrating interval, integration is discontinued and the integrator output is maintained (held) without change during a second time interval spaced from the first time interval by the integrating interval. The held integrator output signal is applied by lines 32a and 32b to integrator output selector 34. Following predetermined selection or non-selection of its output signal by selector 34 the integrator is again reset and the process is repeated for another article.

Selector 34 is controlled in its time of operation by a gating signal on line 20 from controller 14 and functions to selectively apply the held integrator output signal on line 32 to line 36, i.e., if such held integrator output signal defines a weight measurement of interest, e.g., greater than (+) the target value. As discussed below, selector 34 may alternatively apply to line 36 integrator output signals which are lesser than such target value or signals both greater and lesser than the target value. Averaging store and multiplier 38 functions to average and store signals on line 36 and to multiply the same by the aforesaid scale factor, thereby providing on line 40 a signal constituting an index of standard deviation which may be displayed by $\sigma$ display unit 42. While unit 42 is not particularly disclosed in the ensuing description, the same preferably comprises an analog-to-digital converter operative on the line 40 signal and driving a digital display.

Figures 3, 4:
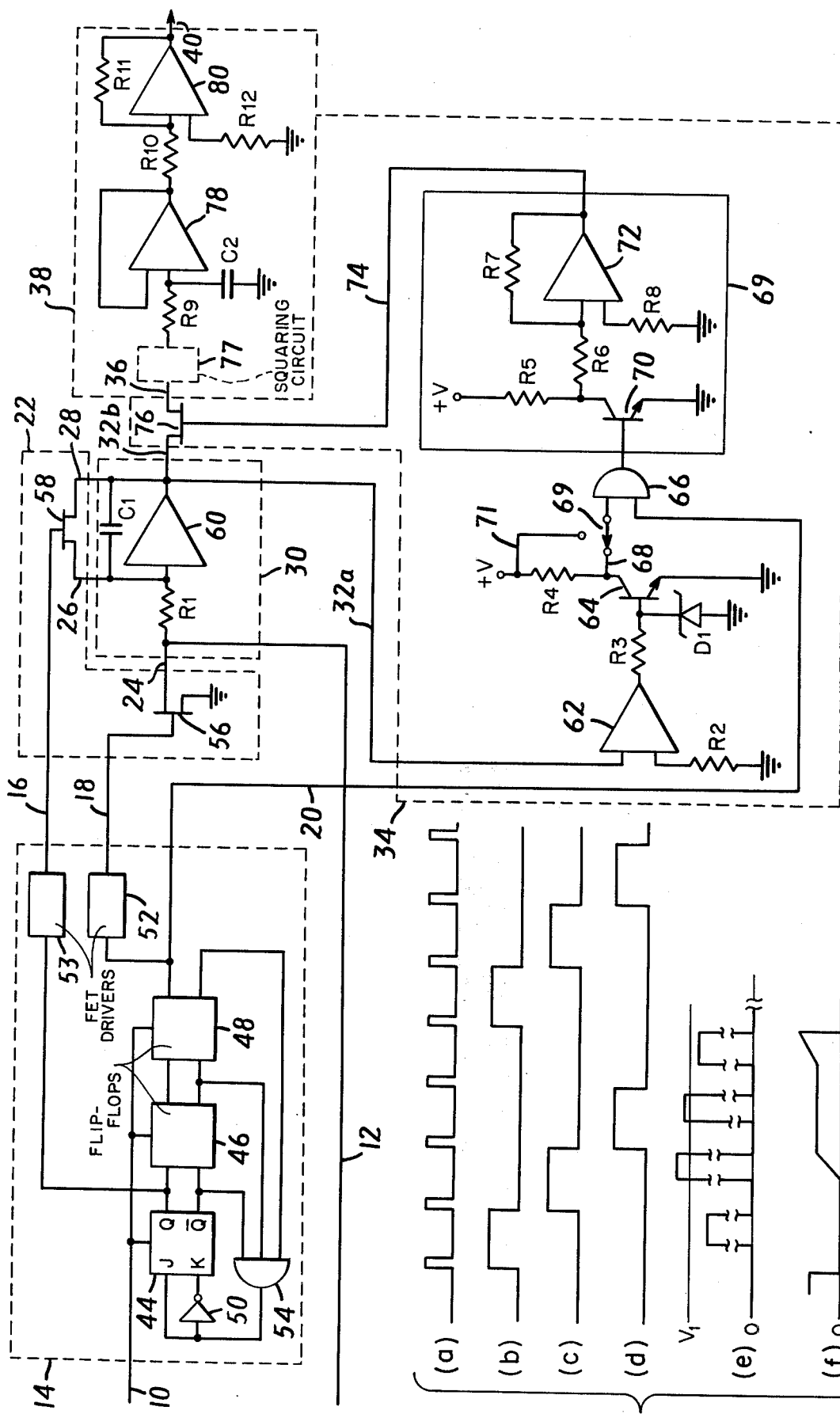
FIG. 3 is a schematic diagram of a preferred embodiment of apparatus according with the invention.
FIG. 4 is a timing diagram showing signals generated in the FIG. 3 embodiment of the invention.

Referring to the schematic diagram of FIG. 3, controller 14 includes a chain of three flip-flops 44, 46 and 48, inverter 50, FET drivers 52 and 53, and AND gate 54. Integrator switch group 22 comprises a pair of field-effect transistor stages 56 and 58. Integrator 30 includes a direct current (DC) amplifier 60 with resistive input R1 and capacitive feedback C1. Integrator output selector 34 includes a comparator circuit comprising DC amplifier 62, input resistor R2, a Zener diode D1, transistor amplifier stage 64 and resistors R3 and R4. The comparator provides a first input to AND gate 66 on line 68, the second AND gate input being supplied by line 20. The AND gate 66 output signal is applied to FET driver 69 wherein it is amplified first by a single stage amplifier 70 having resistor R5 and then by an operational amplifier comprising resistors R6, R7 and R8 and DC amplifier 72. Such amplified output is applied by line 74 to field-effect transistor 76. The circuit structure of drivers 52 and 53 above is identical to that of driver 69.

Store and multiplier 38 includes resistor R9 and capacitor C2, voltage follower 78 and a scaling amplifier comprised of DC amplifier 80 and resistors R10, R11 and R12, R11 being $\sqrt{\pi/2}$ times R10.

Operation of the FIG. 3 apparatus will be discussed now in conjunction with the partial timing diagram illustrated in FIG. 4. In FIG. 4(a), signals appear on line 10 in the form of a train of pulses, each pulse being indicative of the time of ejection of a cigarette from the article characteristic sensor (FIG. 2). Immediately upon such article ejection, a new article is introduced into the sensor for examination. In FIG. 4(e), signals are illustrated such as would be present on line 12. Thus, between each successive pair of pulses in FIG. 4(a), a FIG. 4(e) signal is generated, indicative of the results of the weight measurement made by the sensor. The signals in FIG. 4(e) will be noted to vary in amplitude (weight) about a given predetermined signal amplitude ($V_1$), i.e., some measurements indicating article weight to be less than $V_1$ and others greater than $V_1$.

The signals illustrated in FIGS. 4(b)–(d) respectively show the state of flip-flops 44, 46 and 48. The filp-flops are standard JK units deriving clock pulses from line 10. Assuming all of the flip-flops to be OFF ($\overline{Q}$ of each being HI), AND gate 54 is enabled and applies a HI, e.g., +5v, to the J-input of flip-flop 44. Inverter 50 applies a LO, e.g., 0v, to the K-input of the flip-flop. The initial pulse on line 10 then sets flip-flop 44 (Q HI). FET driver 53 is responsive to a HI input to provide a 0v output and to an LO input to provide a −10v output. Under the presently described condition (HI input), FET driver 53 accordingly drives line 16 to 0v and transistor 58 is rendered conductive wherey capacitor C1 is discharged, thereby resetting integrator 30 to zero output. This condition persists from time $t_1$ of FIG. 4(f) until the second clock pulse appears at $t_2$ on line 10 at which time flip-flop 44 is reset and flip-flop 46 is set. Flip-flop 48 remains in a LO or reset state. With FET driver 52 driving line 18 to −10v, "pinch-off" transistor 56 is non-conductive and the input terminal of integrator 30 follows the line 12 signal then present, i.e., the second signal indicated in FIG. 4(e). Integration of this signal proceeds as shown in FIG. 4(f) until the occurrence of the third clock pulse of line 10 at $t_3$ whereupon flip-flop 46 is reset and flip-flop 48 is set. On this occurrence, FET driver 52 drives line 18 to 0v and renders transistor 56 conductive. Integrator 30 accordingly receives ground potential input and the integrator output signal applied to transistor 76 is held constant at its integration level as shown in FIG. 4(f).

Such integrator output signal is examined by the comparator of integrator output selector 34 and, where the signal is of positive voltage amplitude, transistor stage 64 is rendered non-conductive and the upper input to AND gate 56 is accordingly enabled. Since line 20 is HI during this time period, as shown in FIG. 4(d), AND gate 66 applies a HI to FET driver 69 which drives line 74 to 0v. This signal renders transistor 76 conductive and the integrator output signal is accordingly conducted through transistor 76 for storage in capacitor C2. The voltage across capacitor C2, comprising an average of integrator output signals, is scaled in unit 38 and made available on line 40.

As will be appreciated, where integrator 30 applies a signal of negative voltage amplitude to line 32 AND gate 66 is not enabled and transistor 76 remains non-conductive. By this arrangement, capacitor C2 sees only those integration output signals which depart unidirectionally from such preselected ground amplitude level. In this respect, the circuitry of selector 34 may evidently be modified such that line 74 renders transistor 76 conductive solely on the occurrence of negative polarity integrator output signals.

Where it is desired to process all integrator output signals, irrespective of their sense of departure from the target value, line 68 of selector 34 may include a switch 69. Upon movement of the contact arm of switch 69 from its illustrated position into engagement with the switch contact thereof connected to line 71, the upper input of AND gate 66 is continually connected to a gate-enabling voltage. Under this condition, integrator output signals occurring on line 32b during periods in which the line 20 signal enables gate 66 will be conducted through transistor 76 to line 36 for averaging and scaling in unit 38. Since such integrator output signals are both greater and lesser than the target value, squaring circuit 77 is introduced in series circuit between line 36 and R9 such that C2 receives absolute value signals for averaging.

On the occurrence of the next clock pulse at $t_4$ flip-flop 48 is reset. With all three flip-flops now reset, gate 54 enables flip-flop 44 to be set on occurrence of the further clock pulse at $t_5$. While integration can occur during $t_4$–$t_5$, the same is of no consequence since integrator output zeroing will again occur at $t_5$.

While the preferred embodiments discussed to this juncture contemplate a system operatively responsive to plural input signals, respectively defining time periods of examination of a variable and changes in the variable during such time periods, the invention contemplates systems operatively responsive simply to an input signal indicative of changes in a variable on the passage of time. For example, continuous rolling stock such as paper or fabric may be examined continuously as to weight or like characteristic and the results of such examination sampled and integrated. Selecting circuit means may then process the integrated signals selectively, i.e., in one or the other groupings or collectively on opposite sides of the arithmetic mean of the dispersion, and the selected signals averaged to provide an indication of standard deviation. Alternatively, where the article clocking signal is available, the preferred embodiment provides for the definition of first and second spaced time periods respectively in which the integrator is reset to zero, and in which the integrator output is held constant. Intervening these spaced time periods the integrator is freed for integration. Integrated output signals are selected during the second time period and averaged.

Various changes and modifications now evident to those skilled in the art may readily be introduced in the foregoing functional and detailed descriptions of the invention without departing from the spirit and scope of the claims. Thus, the particularly disclosed embodiments above are intended in an illustrative and not in a limiting sense. The true spirit and scope of the invention is defined in the following claims.

What is claimed is:

1. A system for generating an output signal indicative of the standard deviation of a random variable responsively to system input signals each indicative of a sampled value of said variable, comprising:
   a. integrator means for integrating separately each said input signal and for generating output signals indicative separately of the integrated values of individual ones of said input signals;
   b. signal selector means for generating output signals consisting of said integrator means output signals having amplitude unidirectionally displaced from a predetermined signal amplitude; and
   c. averaging circuit means for averaging said signal selector means output signals and generating an output signal indicative of such averaging, said averaging circuit means output signal constituting said system output signal.

2. The system claimed in claim 1 including first circuit means for resetting said integrator means during first time intervals, said integrator means generating output signals of said predetermined signal amplitude during said first time intervals upon said resetting thereof.

3. The system claimed in claim 2 including second circuit means for maintaining said integrator means output signals at constant amplitude during second time intervals, said first and second time intervals being spaced from one another.

4. The system claimed in claim 3 including third circuit means for confining operation of said signal selector means to said second time intervals.

5. The system claimed in claim 4 wherein said integrator means comprises an amplifier having an input terminal and an output terminal, capacitive circuit means for connecting said input terminal to said output terminal and a resistor connected to said input terminal.

6. The system claimed in claim 5 wherein said first circuit means comprises switch means connected in parallel circuit with said capacitive circuit means for discharging the same during said first time intervals.

7. The system claimed in claim 6 wherein said second circuit means includes switch means for connecting said resistor to ground potential during said second time intervals.

8. The system claimed in claim 4 wherein said third circuit means includes switch means for connecting said integrator means to said averaging circuit means and coincidence circuit means for rendering said switch means conductive during said second time intervals.

9. The system claimed in claim 8 wherein said third circuit means further includes comparator circuit means responsive to the polarity of said integrator means output signals for selectively enabling said coincidence circuit means during said second time intervals.

10. A system for generating an output signal indicative of the standard deviation of a random variable responsively to first input signals defining time periods of examination of said variable and second input signals defining changes in said variable during said time periods, comprising:
   a. timing control circuit means responsive to said first input signals for generating first and second output signals respectively defining first and second spaced time intervals;
   b. integrator means for integrating said second input signals and generating output signals indicative of such integrated second input signals;
   c. first circuit means responsive to said timing control circuit means first output signals for resetting said integrator means during said first time intervals, said integrator means generating output signals of predetermined constant signal amplitude during said resetting thereof;
   d. second circuit means responsive to said timing control circuit means second output signals for maintaining said integrator means output signals at constant amplitude during said second time intervals;
   e. signal selector means responsive to said timing control circuit means second output signals for generating output signals during said second time intervals comprising said integrator means output signals having amplitude unidirectionally different from said predetermined signal amplitude; and
   f. averaging circuit means for averaging said signal selector means output signals and generating an output signal indicative of such averaging, said averaging circuit means output signals constituting said system output signal.

11. A system for generating an output signal indicative of the standard deviation of a random variable responsively to first input signals defining time periods of examination of said variable and second input signals defining changes in said variable during said time periods, comprising:
   a. timing control circuit means responsive to said first input signals for generating first and second output signals respectively defining first and second spaced time intervals;
   b. integrator means for integrating said second input signals and generating output signals indicative of such integrated second input signals;
   c. first circuit means responsive to said timing control circuit means first output signals for resetting said integrator means during said first time intervals, said integrator means generating output signals of predetermined constant signal amplitude during said resetting thereof;
   d. second circuit means responsive to said timing control circuit means second output signals for maintaining said integrator means output signals at constant amplitude during said second time intervals;
   e. signal selector means responsive to said timing control circuit means second output signals for generating output signals during said second time intervals comprising said integrator means output signals occurring during said second time intervals; and
   f. averaging circuit means for averaging said signal selector means output signals and generating an output signal indicative of such averaging, said averaging circuit means output signals constituting said system output signal.

12. A system for generating an output signal indicative of the standard deviation of a random variable responsively to system input signals each indicative of a sampled value of said variable, comprising:
 a. integrator means for integrating separately each said input signal and for generating output signals indicative separately of the integrated values of individual ones of said input signals;
 b. signal selector means for generating output signals consisting of said integrator means output signals occurring during preselected time periods; and
 c. circuit means for averaging said signal selector means output signals and scaling the same by a factor of $\sqrt{\pi/2}$, thereby generating an output signal indicative of such averaging and scaling, said circuit means output signal constituting said system output signal.

* * * * *